(12) United States Patent
Svensson

(10) Patent No.: US 7,784,152 B2
(45) Date of Patent: Aug. 31, 2010

(54) INTEGRATED SEALED AND LUBE FREE PIVOT SYSTEM

(76) Inventor: Roger Svensson, 40 Shadow Cir., Sedona, AZ (US) 86340

( * ) Notice: Subject to any disclaimer, the term of this patent is extended or adjusted under 35 U.S.C. 154(b) by 0 days.

(21) Appl. No.: 12/141,262

(22) Filed: Jun. 18, 2008

(65) Prior Publication Data

US 2009/0313788 A1 Dec. 24, 2009

(51) Int. Cl.
*E05D 11/00* (2006.01)
(52) U.S. Cl. ........................................ 16/273
(58) Field of Classification Search ............... 16/273, 16/274; 384/130, 143; 277/551, 586; 403/370, 403/374.3, 374.4
See application file for complete search history.

(56) References Cited

U.S. PATENT DOCUMENTS

| 445,332 | A | | 1/1891 | Phillips | |
|---|---|---|---|---|---|
| 2,324,688 | A | * | 7/1943 | Finlayson et al. | 277/614 |
| 3,143,387 | A | * | 8/1964 | Person | 439/736 |
| 3,855,896 | A | | 12/1974 | Kaufman | |
| 4,251,182 | A | * | 2/1981 | Schroeder | 414/723 |
| 4,507,005 | A | | 3/1985 | Siewart et al. | |
| 4,575,898 | A | * | 3/1986 | Carlson et al. | 16/274 |
| 4,961,667 | A | | 10/1990 | Reinsma et al. | |
| 5,044,812 | A | | 9/1991 | Ardelt et al. | |
| 5,551,794 | A | * | 9/1996 | Aarre et al. | 403/374.4 |
| 5,626,345 | A | * | 5/1997 | Wallace | 277/309 |
| 5,664,286 | A | * | 9/1997 | Sorimachi | 16/54 |
| 6,304,433 | B2 | * | 10/2001 | O'Neal et al. | 361/679.27 |
| 7,070,331 | B2 | * | 7/2006 | Schaffer et al. | 384/130 |
| 7,441,308 | B1 | * | 10/2008 | Pappas | 16/273 |
| 2008/0235906 | A1 | * | 10/2008 | Arnold et al. | 16/274 |

* cited by examiner

*Primary Examiner*—Victor Batson
*Assistant Examiner*—Matthew Sullivan
(74) *Attorney, Agent, or Firm*—Jeffrey D. Moy; Weiss & Moy, P.C.

(57) ABSTRACT

A pivot assembly for securing a pair of mounting lugs and stabilizing a machine member has an axis member having a first end member and a second end member. An opening is formed in both the first and second end members. A pair of expansion sleeves is provided wherein one of the pair of expansion sleeves is positioned over each of the first end and second end members. A pair of locking devices is provided wherein one locking device is inserted into the opening formed in each of the first and second end members of the axis member. The locking devices engage the pair of expansion sleeves causing the expansion sleeves to expand to secure the axis member in a pair of mounting lugs. A chamber member is formed around a central area of the axis member. At least one lubricant chamber member is formed between the central area of the axis member and the chamber member. A pair of friction seal members is provided wherein one friction seal member is attached on each end of the axis member and to the chamber member to form an annular sealing around the axis member and the chamber member to prevent a lubricant in the lubricant chamber member from leaking.

15 Claims, 2 Drawing Sheets

INTEGRATED SEALED AND LUBE FREE PIVOT SYSTEM

FIELD OF THE INVENTION

This invention relates generally to a pivot system that allows two machine element members to pivot around a fixed axis, and more specifically, to an extended life integrated, sealed and lube free machine pivot system which controls, integrates, seals and allows two machine element members to pivot around a fixed axis.

BACKGROUND OF THE INVENTION

The conventional way to achieve pivotability in a connection between two machine members is to use a hinge journalled in bearings. A hinge journalled in bearings have one or more bearings arranged inside one machine member and a cylindrical pin hinging through the bearing and a pair of mounting lugs without mounting hole locking capabilities, attached by various methods to the outside of one mounting lug, to prevent the pin from falling out when linkage wear appears. The surface between the cylindrical part of the pin and the inner diameter of the bearing is greased through a grease channel, either through the pin or through the connecting machine member and the bushing.

There are several problems with the conventional type of pivot design. The most common problem is that the cylindrical pin, which most often is harder than the material of the mounting lugs, causes the hole surface of the mounting lugs to wear, thereby causing instability in, and eventually breakdown of, the linkage. The wear process is of an accelerating nature and eventually, the machine must be taken apart for the mounting lug holes to be welded and line bored to recreate the original tolerance between the cylindrical part of the pin and the inner surface of the mounting lug holes.

Once the wear process in the mounting lugs has started, which often happens during the machine manufacturers warranty period, and the pin is moving in the mounting lugs, all impact forces are transferred into the bearing member which deteriorates in various ways depending on the bearing material, stress factors, and work environment. This severely lowers the functional life time of the bearing member Another problem with this type of pivot engineering is in regards to greasing. A proper greasing program has to be in place where different linkages need different amounts of grease at different times. Many times the machine users have difficulties following the schedule which causes premature wear.

An additional problem is the fact that abrasive materials and dust from the working environment often make their way into the surface area between the cylindrical part of the pin and the inner surface of the bearing. The abrasive materials and dust mixes with the grease and forms a grinding paste which quickly destroys the linkage. The abrasive dust mixed with the grease also travels out into the space between the pin and the inner surface of the mounting lug hole, thereby causing the wear process to accelerate further.

Therefore, a need existed to provide a system and method to overcome the above problem.

SUMMARY OF THE INVENTION

A pivot assembly for securing a pair of mounting lugs and stabilizing a machine member has an axis member having a first end member and a second end member. An opening is formed in both the first and second end members. A pair of expansion sleeves is provided wherein one of the pair of expansion sleeves is positioned over each of the first end and second end members. A pair of locking devices is provided wherein one locking device is inserted into the opening formed in each of the first and second end members of the axis member. The locking devices engage the pair of expansion sleeves causing the expansion sleeves to expand to secure the axis member in a pair of mounting lugs. A chamber member is formed around a central area of the axis member. At least one lubricant chamber member is formed between the central area of the axis member and the chamber member. A pair of friction seal members is provided wherein one friction seal member is attached on each end of the axis member and to the chamber member to form an annular sealing around the axis member and the chamber member to prevent a lubricant in the lubricant chamber member from leaking.

The present invention is best understood by reference to the following detailed description when read in conjunction with the accompanying drawings.

BRIEF DESCRIPTION OF THE DRAWINGS

Common reference numerals are used throughout the drawings and detailed descriptions to indicate like elements.

DETAILED DESCRIPTION

Figure 1:
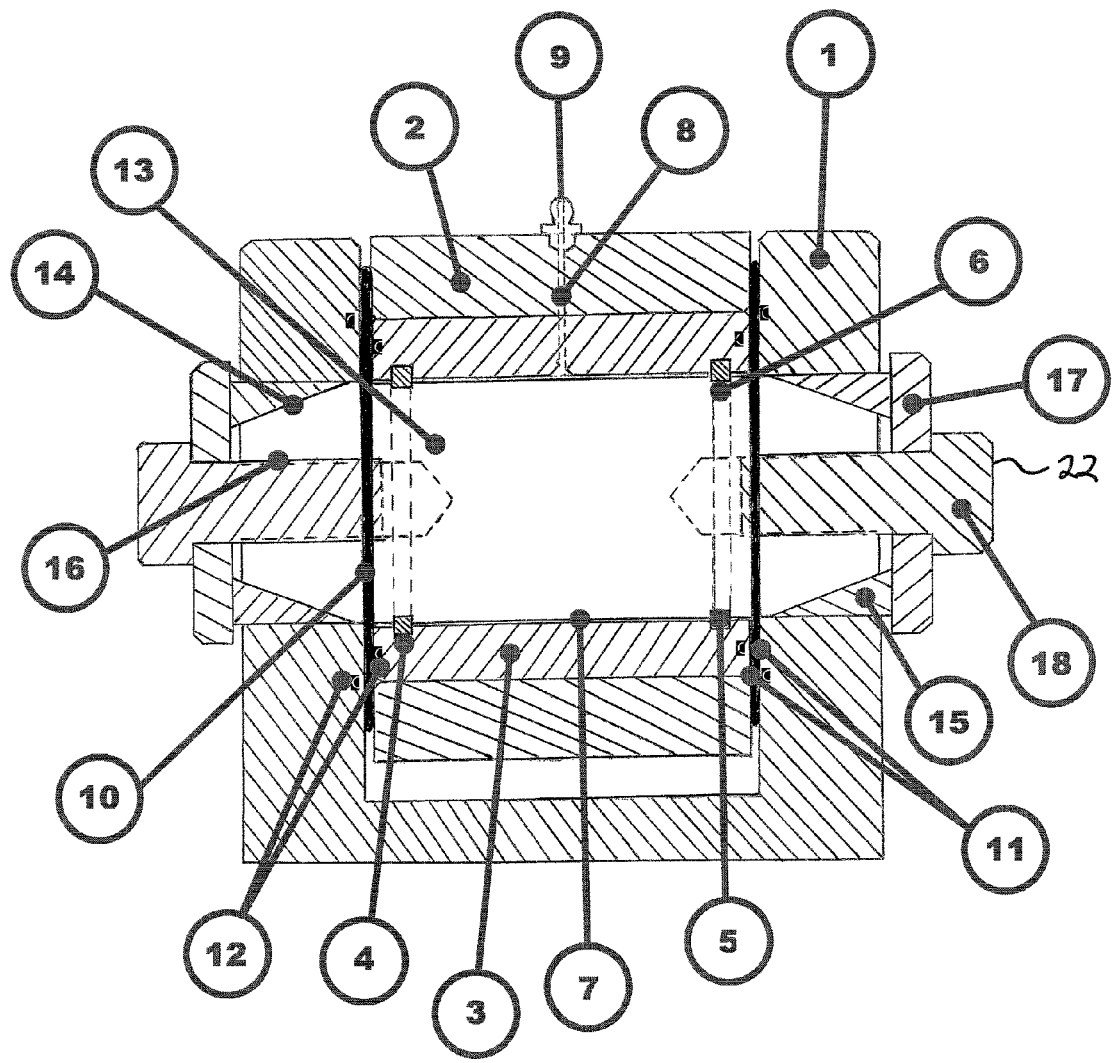
FIG. 1 is a cross-sectional view of the pivot system of the present invention.
Figure 2:
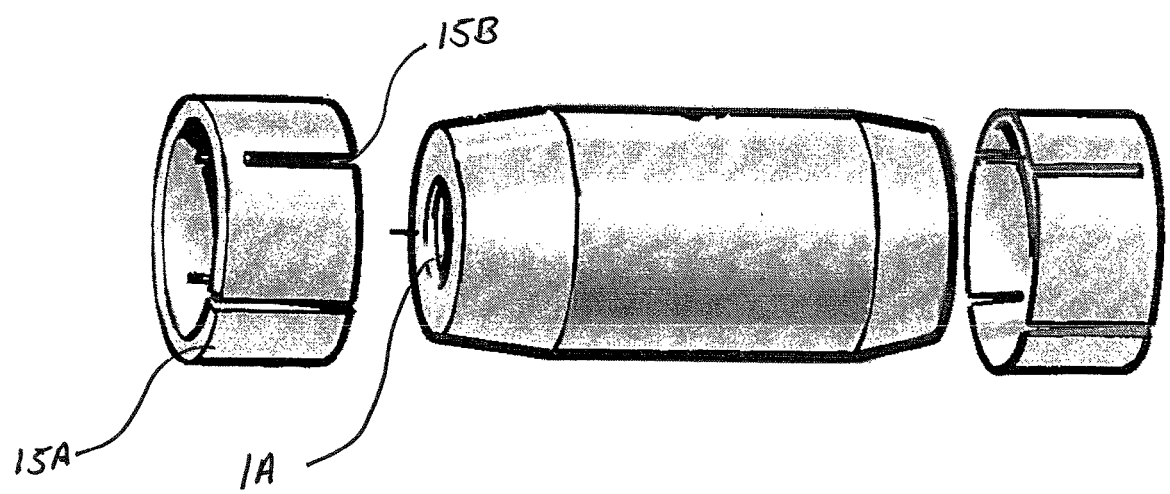
FIG. 2 is a perspective view of the expansion sleeves used in the pivot system of the present invention.

The present invention is a pivot system 100 that will allows two machine element members to pivot around a fixed axis. The pivot system 100 is an extremely wear resistant integrated, sealed and lube free machine pivot system comprising a range of functionalities. The pivot system 100 will allow two machine element members to pivot around a fixed axis with reduced wear thereby reducing the breakdown of the linkage. The pivot system 100 provides an integrated system for a machine pivot where an integrated pivot system axis member 13, mechanically locked into a pair of mounting lug members 1 by means of a pair of expansion sleeve members 15, and one or more lube free, sealed pivoting lubricant chamber members 7 positioned in the housing 2 in the machine member, rotating around the axis member 13 of the extended life, integrated machine pivot system 100, thereby preventing the disadvantages described above.

Referring to the Figures, the pivot system 100 has an axis member 13. A channel 13A is formed in the axis member 13. The channel 13A may run only a portion of the length of the axis member 13 so that an opening/partial channel is formed in each end of the axis member. Alternatively, the channel 13A may run an entire length of the axis member 13. In accordance with one embodiment, end sections of the channel 13A are threaded. Alternatively, the end sections of the axis member 13 may be provided with external threading 13B.

A pair of end members 14 is formed on each end of the axis member 13. In the embodiment shown in the Figures, the end members 14 are tapered so that the distal end of the end members 14 is narrower than the proximal end. However, this is just shown as an example. The end members 14 may be cylindrical in shape as well.

The pivot system 100 has a pair of expansion sleeve members 15. Each expansion sleeve member 15 interacts with one formed end member 14 of the axis member 13 and a corresponding hole 1A formed in one of the mounting lug members 1. In the present embodiment, each expansion sleeve 15 has a housing 15A. In accordance with one embodiment of the present invention, the housing 15A is cylindrical in shape while the end member 14 of the axis member 13 is conical. However, in accordance with another embodiment of the present invention, the housing 15A is conical in shape while the end member 14 is cylindrical.

Each housing 15A is hollow and has a pair of open ends. A plurality of slots 15B is formed in the housing 15A and goes through the housing 15A into the hollow section of the housing 15A. The slots 15B generally run along a length of the housing 15A. At least one of the pluralities of slots 15B will run an entire length of the housing 15A. The slots 15B act as annular wedges, with the apex pointing towards the central section of the axis member 13. The number of slots 15B formed in the housing 15A is based on the diameter of the housing 15A. The larger the diameter of the housing 15A the more slots 15B are generally needed. In general, four to six slots 150B are formed in each housing 15A. The slots 15B will run vertically down the side of the housing 15A. One slot 15B may run the length of the housing 14. The housing 15A is generally made of a sturdy metallic material.

The expansion sleeve members 15 are used for anchoring the axis member 13 in the holes 1A of the respective mounting lug members 1. The expansion sleeve members 15 provide a metallic locking mechanism between itself and the holes 1A formed in the mounting lug member 1. The expansion sleeve members 15 eliminates any wear in the holes 1A of the pivot mounting lug members 10 as well as creating a perfect stability of the surface of the axis member 13 for one or more non metallic high wear resistant cylindrical or split pivoting lubricant chamber members 7 to integrate and rotate around the axis member 13. This is accomplished by the expansion sleeve members 15 expanding and pressing against the interior walls of the holes 1A. The respective expansion sleeve member 15 expands over the end members 14 of the axis member 13 by means of a locking device 20. The locking device 20 applies pressure on the expansion sleeve members 15. The slots 15B in the expansion sleeve members 15 allow the expansion sleeve members 15 to expand and press against the interior walls of the openings 1A in the mounting lug members 1.

The pivot system 100 uses a pair of locking devices 20. Each locking device 20 is used to secure a respective expansion sleeve members 15 in the proper hole 1A formed in the mounting lug members 1. In the present embodiment, the locking devices 20 are a pair of tension washers 17 and a pair of locking members 18.

The locking member 18 has a threaded end member 16 and a head member 22. When inserted into the channel 13A, the threaded end member 16 will extend coaxially into the channel 13A of the axis member 13. The thread end member 16 will engage threads formed in the channel 13A. The head member 22 of the locking member 18 engages the expansion sleeve 15 so as to apply pressure to the corresponding expansion sleeve member 15. The pressure causes the expansion sleeve member 15 to expand and press against the interior walls of the hole 1A formed in the mounting lug members 1.

A tension washer member 17 may also be provided. The tension washer member 17 has an opening formed through a central area thereof through which the locking member 18 is inserted. The tension washer member 17 is positioned so that a smooth side of the tension washer member 17 faces the expansion sleeve member 15. The tension washer member 17 is used to apply pressure to one of the pair of expansion sleeve member 15 in order to cause the expansion sleeve member 15 to expand and press against the interior walls of the hole formed in the mounting lug member 1. The tension washer member 17 is designed in a strong metal with properties allowing a static tension to be built up, and kept, between the head member 22 and the threaded end member 22 of the locking member 18.

The axis member 13 has two or more friction seal grooves 6 formed on the exterior cylindrical surface thereof. The friction seal grooves 6 are generally formed at each end of the axis member 13 in front of the end members 14. The friction seal grooves 6 are integrate with an equal number of lube free rotating friction seals 5. An axis chamber member 3 formed around the central area of the axis member 13. In other words, the axis chamber member 3 is formed and positioned between the two end members 13.

A gap is formed between the axis chamber member 3 and the axis member 13 to form one or more metallic or non-metallic high wear resistant, cylindrical or split, pivoting lubricant chamber member 7. The pivoting lubricant chamber member 7 is used to store lubrication around the axis member 13. A friction seal groove 4 is formed in the axis chamber member 3. The friction seal grooves 4 formed in the axis chamber member 3 and the corresponding friction seal groove 6 in the axis member 13 are used to secure the friction seals 5 in place to prevent the shifting of the friction seals 5. When the axis member 13 is properly mounted in the holes 1A formed in the mounting lug members 1, the friction seals 5 form an annular sealing around the axis member 13 and the axis chamber member 3 thereby preventing the lubricant applied to the axis member 13 and stored in the pivoting lubricant chamber member 7 from leaking out.

The axis member 13 can integrate one or more metallic or non-metallic high wear resistant, cylindrical or split, pivoting lubricant chamber members 7. If the pivoting lubricant chamber member 7 is split, the surfaces facing each other when integrated have a number of indentations and knobs fitting into each other to ensure the integrity of the pivoting lubricant chamber member 7 when integrated. A lubrication channel 8 is in fluid communication with the pivoting lubricant chamber member 7. The lubrication channel 8 provides a pathway to inject a lubricant into the pivoting lubricant chamber member 7. In accordance with one embodiment of the present invention, the lubrication channel 8 runs through a machine member housing 2 and the axis chamber member 3 to the pivoting lubricant chamber member 7. A nipple member 9 is attached to an end of the lubrication channel 8. The nipple member 9 is generally attached to an end opposite to the pivoting lubricant chamber member 7. The nipple member 9 allows the lubricant to be injected into the lubrication channel 8 while prevent the lubricant from exiting out of the nipple member 9. Alternatively, a lubrication channel 8A can be added to the axis member 13, FIG. 3.

The extended life, sealed and lube free machine pivot system 100 also includes one or more pairs of sealed friction spacers 10 engineered to integrate within the machine pivot system 100 by being seated between the system pivoting lubricant chamber member 7 and the mounting lug member on the respective side of the pivot system 100. The sealed system friction spacer member 10 has a groove 11 directly opposite the groove in the cylindrical surface on both sides of the cylindrical or split pivoting lubricant chamber member 7, as well as on the opposite side, facing the respective pivot mounting lug members 1. A pair of lube free rotating friction seals 12 is integrated, one on each side. The friction spacer members 10 ensure against axial movement in pivot system 100 and provide additional sealing of the lube free machine pivots.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A pivot assembly for securing a pair of mounting lugs and stabilizing a machine member comprising:
   an axis member having a first end member and a second end member, an opening formed in both the first and second end member;
   a pair of expansion sleeves, wherein one of the pair of expansion sleeves is positioned over each of the first end and second end of the axis member, each expansion sleeve has a plurality of slots formed there through, wherein at least one of the plurality of slots runs a length of the expansion sleeve;
   a pair of locking devices, wherein one locking device is inserted into the opening formed in each end of the axis member, the locking devices engaging the pair of expansion sleeves causing the expansion sleeves to expand to secure the axis member in the mounting lugs;
   a chamber member formed around a central area of the axis member;
   at least one lubricant chamber member formed between the central area of the axis member and the chamber member;
   a pair of sealed friction spacers wherein the pair of friction spacers is positioned between the chamber member and the mounting lug member to ensure against axial movement in the pivot assembly;
   spacer grooves formed on a front and back surface of each spacer;
   chamber grooves formed around an interior perimeter of the chamber member, wherein one chamber groove is aligned with a corresponding spacer groove;
   a pair of rotating friction spacer seals wherein one rotating friction spacer seal is positioned on the front surface of the spacer and a second rotating friction spacer is positioned on the back surface of the spacer, each rotating friction spacer seal positioned in corresponding aligned spacer and chamber grooves;
   a pair of friction seal members wherein one friction seal member is attached on each end of the axis member and to the chamber member to form an annular sealing around the axis member and the chamber member to prevent a lubricant in the lubricant chamber member from leaking;
   a pair of axle seal grooves, wherein one axle seal groove is formed in each end of the axis member; and
   a pair of seal grooves formed around an interior perimeter of the chamber member, wherein one seal groove is formed in each end of the chamber member;
   wherein each of the pair of axle seal grooves is aligned with a corresponding seal groove formed in the chamber member and holds a corresponding friction seal member to form a secure seal to prevent the lubricant in the lubricant chamber member from leaking.

2. A pivot assembly in accordance with claim 1 further comprising:
   a lubrication channel in fluid communication with the at least one lubricant chamber member; and
   a lubrication nipple attached to one end of the lubrication channel.

3. A pivot assembly in accordance with claim 1 wherein the first end and second end of the axis member are tapered so that a distal end of both the first and second end members is narrower than a proximal end of the first and second end members.

4. A pivot assembly in accordance with claim 3 wherein each of the pair of expansion sleeves is cylindrical in shape.

5. A pivot assembly in accordance with claim 4 each of the pair of expansion sleeves comprises:
   a housing having a hollow interior and pair of open ends; and
   a plurality of slots running along a length of the housing.

6. A pivot assembly in accordance with claim 5 wherein the plurality of slots extend through the housing into the hollow interior.

7. A pivot assembly in accordance with claim 6 wherein at least one of the plurality of slots runs an entire length of housing and into the hollow interior.

8. A pivot assembly in accordance with claim 1 wherein each locking device comprises:
   a threaded pin member; and
   a head member coupled to one end of the pin member.

9. A pivot assembly in accordance with claim 8 further comprising a tension washer member having an opening formed through a central area thereof through which the threaded pin member is inserted.

10. A pivot assembly for securing a pair of mounting lugs and stabilizing a machine member comprising:
   an axis member having a first end member and a second end member, the first end and second end being tapered so that a distal end of both the first and second end members is narrower than a proximal end;
   a channel running a length of the axis member;
   a pair of cylindrical expansion sleeves, wherein one of the pair of cylindrical expansion sleeves is positioned over each of the first end and second end of the axis member, each expansion rotating friction spacer seal is positioned on the front surface of the spacer and a second rotating friction spacer is positioned on the back surface of the spacer, each rotating friction spacer seal positioned in corresponding aligned spacer and chamber grooves;
   a pair of friction seal members wherein one friction seal member is attached on each end of the axis member and to the chamber member to form an annular sealing around the axis member and the chamber member to prevent a lubricant in the lubricant chamber member from leaking;
   a pair of axle seal grooves, wherein one axle seal groove is formed in each end of the axis member;
   a pair of seal grooves formed around an interior perimeter of the chamber member, wherein one seal groove is formed in each end of the chamber member;
   wherein each of the pair of axle seal grooves is aligned with a corresponding seal groove formed in the chamber member and holds a corresponding friction seal member to form a secure seal to prevent the lubricant in the lubricant chamber member from leaking;
   a lubrication channel in fluid communication with the at least one lubricant chamber member; and
   sleeve has a plurality of slots formed there through, wherein at least one of the plurality of slots runs a length of the expansion sleeve;
   a pair of locking devices, wherein one locking device is inserted into the opening formed in each end of the axis member, the locking devices engaging the pair of cylindrical expansion sleeves causing the cylindrical expansion sleeves to expand to secure the axis member in the mounting lugs;

a chamber member formed around a central area of the axis member;

at least one lubricant chamber member formed between the central area of the axis member and the chamber member;

a pair of sealed friction spacers wherein the pair of friction spacers is positioned between the chamber member and the mounting lug member to ensure against axial movement in the pivot assembly;

spacer grooves formed on a front and back surface of each spacer;

chamber grooves formed around an interior perimeter of the chamber member, wherein one chamber groove is aligned with a corresponding spacer groove;

a pair of rotating friction spacer seals wherein one a lubrication nipple attached to one end of the lubrication channel.

11. A pivot assembly in accordance with claim 10 each of the pair of expansion sleeves comprises:

a housing having a hollow interior and pair of open ends; and a plurality of slots running along a length of the housing, wherein the plurality of slots extend through the housing into the hollow interior.

12. A pivot assembly in accordance with claim 11 wherein at least one of the plurality of slots runs an entire length of housing and into the hollow interior.

13. A pivot assembly in accordance with claim 10 wherein each locking device comprises:

a threaded pin member;

a head member coupled to one end of the pin member; and a tension washer member having an opening formed through a central area thereof through which the threaded pin member is inserted.

14. A pivot assembly for securing a pair of mounting lugs and stabilizing a machine member comprising:

an axis member having a first end member and a second end member, the first end and second end being tapered so that a distal end of both the first and second end members is narrower than a proximal end;

a channel running a length of the axis member;

a pair of cylindrical expansion sleeves, wherein one of the pair of cylindrical expansion sleeves is positioned over each of the first end and second end of the axis member, each expansion sleeve has a plurality of slots formed there through, wherein at least one of the plurality of slots runs a length of the expansion sleeve;

a pair of locking devices, wherein one locking device is inserted into the opening formed in each end of the axis member, the locking devices engaging the pair of cylindrical expansion sleeves causing the cylindrical expansion sleeves to expand to secure the axis member in the mounting lugs;

a chamber member formed around a central area of the axis member;

at least one lubricant chamber member formed between the central area of the axis member and the chamber member;

a pair of friction seal members wherein one friction seal member is attached on each end of the axis member and to the chamber member to form an annular sealing around the axis member and the chamber member to prevent a lubricant in the lubricant chamber member from leaking;

a pair of axle seal grooves, wherein one axle seal groove is formed in each end of the axis member;

a pair of seal grooves formed around an interior perimeter of the chamber member, wherein one seal groove is formed in each end of the chamber member;

wherein each of the pair of axle seal grooves is aligned with a corresponding seal groove formed in the chamber member and holds a corresponding friction seal member to form a secure seal to prevent the lubricant in the lubricant chamber member from leaking;

a lubrication channel in fluid communication with the at least one lubricant chamber member;

a lubrication nipple attached to one end of the lubrication channel;

a pair of sealed friction spacers wherein the pair of friction spacers is positioned between the chamber member and the mounting lug member;

a plurality of spacer seal grooves; and a pair of spacer seals formed on each end of each sealed friction spacer, wherein each spacer seal engages a corresponding spacer seal groove.

15. A pivot assembly in accordance with claim 14 wherein each locking device comprises:

a threaded pin member;

a head member coupled to one end of the pin member; and a tension washer member having an opening formed through a central area thereof through which the threaded pin member is inserted.

* * * * *